United States Patent
Li et al.

(10) Patent No.: US 11,738,225 B2
(45) Date of Patent: Aug. 29, 2023

(54) PREPARATION METHOD FOR COMPOSITE FIRE EXTINGUISHING AGENT WITH COOLING FUNCTION

(71) Applicant: Civil Aviation University of China, Tianjin (CN)

(72) Inventors: Xiutao Li, Tianjin (CN); Xiaomeng Zhou, Tianjin (CN)

( * ) Notice: Subject to any disclaimer, the term of this patent is extended or adjusted under 35 U.S.C. 154(b) by 0 days.

(21) Appl. No.: 17/992,960

(22) Filed: Nov. 23, 2022

(65) Prior Publication Data

US 2023/0158353 A1    May 25, 2023

(30) Foreign Application Priority Data

Nov. 23, 2021    (CN) .......................... 202111393988.9

(51) Int. Cl.
*A62D 1/00*    (2006.01)

(52) U.S. Cl.
CPC .......... *A62D 1/0014* (2013.01); *A62D 1/0092* (2013.01)

(58) Field of Classification Search
None
See application file for complete search history.

(56) References Cited

U.S. PATENT DOCUMENTS

| | | | |
|---|---|---|---|
| 2013/0195938 A1* | 8/2013 | Baran, Jr. | A61K 9/14 514/629 |
| 2016/0008649 A1 | 1/2016 | Kountz et al. | |

FOREIGN PATENT DOCUMENTS

| | | | |
|---|---|---|---|
| CN | 103436896 A | * | 12/2013 |
| CN | 110474822 A | | 11/2019 |
| CN | 112439153 A | | 3/2021 |

OTHER PUBLICATIONS

CN-102514322-A (English Language Abstract). (Year: 2012).*
CN-103436337-A (English Language Abstract). (Year: 2013).*
CN-108409283-A (English Language Abstract). (Year: 2018).*
CN-107903017-A (English Language Abstract). (Year: 2018).*
CN-104744011-A (English Language Abstract) (Year: 2015).*

* cited by examiner

*Primary Examiner* — Joseph D Anthony
(74) *Attorney, Agent, or Firm* — Jose Cherson Weissbrot

(57) ABSTRACT

A preparation method for a composite fire extinguishing agent with a cooling function is provided, comprising the steps of conducting refining and hydrophobic treating on heat-absorbing material; and mixing the treated heat-absorbing material and a fire extinguishing agent proportionally to obtain a composite fire extinguishing agent with a cooling function. The present invention enhances the cooling performance of the fire extinguishing agent by adding the heat-absorbing material on the basis of the existing fire extinguishing agent, wherein the heat-absorbing material can absorb the heat released by batteries through phase transition (solid-liquid) heat absorption and decomposition heat absorption.

6 Claims, No Drawings

PREPARATION METHOD FOR COMPOSITE FIRE EXTINGUISHING AGENT WITH COOLING FUNCTION

TECHNICAL FIELD

The present invention belongs to the technical field of preparation of fire extinguishing agents, and particularly relates to a preparation method for a composite fire extinguishing agent with a cooling function.

BACKGROUND

As a carrier of new energy, the battery has been widely used. However, because the battery is prone to generating thermal runaway and causing fire and explosion accidents, its thermal safety problem has always been the focus of social attention. Battery fire is difficult to be extinguished for the main reason that the temperature in the battery is high and thermal runaway continues to occur so that secondary reignition of the battery is caused. Therefore, for the battery fire, not only open flame needs to be extinguished, but also the battery needs to be quickly cooled. In the existing frequently-used fire extinguishing agent, water has the best cooling effect, but strong electrical conductivity, and is easy to generate secondary disasters. Chemical gas extinguishing agents have good fire extinguishing performance, no electrical conductivity and excellent cleaning performance, but have poor cooling effect. For example, the latent heat of vaporization of perfluorhexanone extinguishing agents is only 88 kJ/kg, which is far less than the latent heat 2257 kJ/kg of vaporization of water. Powder extinguishing agents have the strongest fire extinguishing efficiency and are non-conductive, but have almost no cooling effect. Therefore, to solve the problem of reignition of the battery fire, it is necessary to improve the cooling effect of the existing chemical gas extinguishing agents and powder extinguishing agents.

SUMMARY

To solve the above problem, the purpose of the present invention is to provide a preparation method for a composite fire extinguishing agent with a cooling function.

To achieve the above purpose, the preparation method for the composite fire extinguishing agent with the cooling function provided by the present invention comprises the following steps conducted in sequence:

1) conducting refining and hydrophobic treating on heat-absorbing material;

2) mixing the treated heat-absorbing material and a fire extinguishing agent proportionally to obtain a composite fire extinguishing agent with a cooling function.

In step 1), the heat-absorbing material is crystalline hydrated salt which is selected from at least one of $Ba(OH)_2 \cdot 8H_2O$, $MgCl_2 \cdot 6H_2O$, $NH_4Al(SO_4)_3 \cdot 12H_2O$ and $Na_2P_2O_7 \cdot 10H_2O$.

In step 1), a refining treatment method of the heat-absorbing material comprises: refining the heat-absorbing material by at least one of a ball milling method, a supersonic airflow crushing method and a spray drying method to obtain heat-absorbing material powder with a particle size of less than or equal to 20 μm.

In step 1), a hydrophobic treatment method of the heat-absorbing material comprises: stirring and dispersing the refined heat-absorbing material powder in anhydrous n-hexane; then adding emulsified silicone oil with mass fraction of 1-3% and mixing evenly; continuing the stirring for 5-6 hours at 45° C.; then conducting the hydrophobic treatment in a reactor at temperature of 50-60° C. for 7-10 hours; recovering most n-hexane by reduced pressure distillation; and finally, conducting drying to obtain the hydrophobic heat-absorbing material.

In step 2), the fire extinguishing agent is at least one of a powder extinguishing agent and a chemical gas extinguishing agent.

The powder extinguishing agent is selected from at least one of monoammonium phosphate, ammonium dihydrogen phosphate, potassium dihydrogen phosphate, sodium bicarbonate and potassium bicarbonate.

The chemical gas extinguishing agent is selected from at least one of 2-bromotrifluoropropylene, heptafluoropropane, hexafluoropropane, monobromotrifluoromethane, monobromochlorodifluoromethane, cis-1,1,1,4,4,4,-hexafluoro-2-butene, trans-1,1,1,4,4,4,-hexafluoro-2-butene, 3,4,5,5,5-pentafluoro-3-(trifluoromethyl)pent-1-ene, 1,1,1,2,3,4,5,5,5-nonafluoro-4-(trifluoromethyl)pent-2-ene, 1-methoxy-nonafluorobutane, 1-methoxy-heptafluoropropane, perfluoro-2-methyl-3-pentanone, perfluoro-3-methyl-2-butanone and 1,2,2,3,3,4,4-heptafluorocyclopentane.

In step 2), the mixing ratio of the heat-absorbing material and the fire extinguishing agent is 1-50:50-99.

The powder extinguishing agent is subjected to refining and hydrophobic treatment before mixed with the treated heat-absorbing material; a treatment method comprises: refining the fire extinguishing agent by at least one of the ball milling method, the supersonic airflow crushing method and the spray drying method to obtain fire extinguishing agent powder with particle size of less than or equal to 20 μm; stirring and dispersing the refined fire extinguishing agent powder in anhydrous n-hexane; then adding emulsified silicone oil with a mass fraction of 1-3% and mixing evenly; continusing the stirring at temperature of 55° C. for 1-3 hours; recovering most n-hexane by reduced pressure distillation; and then conducting hydrophobic treatment at normal pressure and temperature of 80-100° C. for 3-5 hours to obtain the hydrophobic powder extinguishing agent.

Compared with the prior art, the present invention has the following beneficial effects:

(1) The present invention significantly enhances the cooling performance of the fire extinguishing agent by adding the heat-absorbing material, so that the fire extinguishing agent can be used to extinguish battery fire and effectively prevent the secondary reignition of the battery.

(2) The heat-absorbing material used in the present invention is mainly inorganic crystalline hydrated salt which is non-combustible and has a fire extinguishing effect. Therefore, the fire extinguishing efficiency can be improved while enhancing the cooling effect of the fire extinguishing agent.

DETAILED DESCRIPTION

The present invention is further explained below through the description of specific embodiments, but specific embodiments do not limit the present invention. Those skilled in the art can make various amendments or improvements according to the basic thought of the present invention, and the amendments and improvements belong to the scope of the present invention on the premise of not deviating from the basic thought of the present invention.

The preparation method for the composite fire extinguishing agent with the cooling function provided by the present invention enhances the cooling performance of the fire extinguishing agent by adding the heat-absorbing material on the basis of the existing fire extinguishing agent. The heat-absorbing material can absorb the heat released by the battery through phase transition (solid-liquid) heat absorption and decomposition heat absorption. To avoid influencing the fluidity and the dispersability of the fire extinguishing agent after the addition of the heat-absorbing material, it is necessary to conduct hydrophobic treatment on the heat-absorbing material first. Meanwhile, high temperature of the traditional hydrophobic method is easy to cause phase transition of the heat-absorbing material. Therefore, the high-pressure and low-temperature hydrophobic method is used to ensure the integrity of water-absorbing material particles. In addition, to avoid reducing the fire extinguishing performance of the composite fire extinguishing agent after the addition of the heat-absorbing material, the heat-absorbing materials used in the present invention have excellent fire extinguishing performance. Therefore, the fire extinguishing efficiency can be improved while enhancing the cooling performance.

The present invention is described below in detail in combination with specific embodiments.

Embodiment 1

Firstly, 200 g of Ba(OH)2·8H2O is refined by a supersonic airflow crushing method to obtain powder with a particle size of less than or equal to 16 μm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 60° C. for 10 hours; and after most n-hexane is recovered by reduced pressure distillation at 45° C., drying is continued to obtain the hydrophobic heat-absorbing material.

500 g of ammonium dihydrogen phosphate is refined by the supersonic airflow crushing method to obtain powder with a particle size of less than or equal to 18 μm; then the refined powder is stirred and dispersed in 5000 mL of anhydrous n-hexane; then 15 g of emulsified silicone oil is added and mixed evenly; the stirring is continued for 1 hour at temperature of 55° C.; most n-hexane is recovered by reduced pressure distillation; and then hydrophobic treatment is conducted at normal pressure and temperature of 100° C. for 3 hours to obtain the hydrophobic fire extinguishing agent.

Then, the hydrophobic heat-absorbing material and a hydrophobic fire extinguishing agent are mixed in a mass ratio of 30:70 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 2

Firstly, 200 g of MgCl2·6H2O is refined by a ball milling method to obtain powder with a particle size of less than or equal to 10 mm; the refined powder is stirred and dispersed in 2000 mL of anhydrous n-hexane; then 2 g of emulsified silicone oil is added and mixed evenly; the stirring is continued for 6 hours at temperature of 45° C.; then the hydrophobic treatment is conducted in a reactor at temperature of 50° C. for 10 hours; and after most n-hexane is recovered by reduced pressure distillation at 45° C., drying is continued to obtain the hydrophobic heat-absorbing material.

200 g of potassium dihydrogen phosphate is refined by the ball milling method to obtain powder with a particle size of less than or equal to 10 m; then the refined powder is stirred and dispersed in 2000 mL of anhydrous n-hexane; then 5 g of emulsified silicone oil is added and mixed evenly; the stirring is continued for 1 hour at temperature of 55° C.; most n-hexane is recovered by reduced pressure distillation; and then hydrophobic treatment is conducted at normal pressure and temperature of 100° C. for 3 hours to obtain the hydrophobic fire extinguishing agent.

Then, the hydrophobic heat-absorbing material and a hydrophobic fire extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 3

Firstly, 200 g of NH4Al(SO4)3·12H2O is refined by the ball milling method to obtain powder with a particle size of less than or equal to 11 mm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 60° C. for 10 hours; and after most n-hexane is recovered by reduced pressure distillation at 45° C., drying is continued to obtain the hydrophobic heat-absorbing material.

200 g of monoammonium phosphate is refined by the ball milling method to obtain powder with a particle size of less than or equal to 15 μm; then the refined powder is stirred and dispersed in 2000 mL of anhydrous n-hexane; then 2 g of emulsified silicone oil is added and mixed evenly; the stirring is continued for 1 hour at temperature of 55° C.; most n-hexane is recovered by reduced pressure distillation; and then hydrophobic treatment is conducted at normal pressure and temperature of 100° C. for 3 hours to obtain the hydrophobic fire extinguishing agent.

Then, the hydrophobic heat-absorbing material and a hydrophobic fire extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 4

Firstly, 200 g of Na2P2O7·10H2O is refined by a spray drying method to obtain powder with a particle size of less than or equal to 16 mm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 60° C. for 10 hours; and after most n-hexane is recovered by reduced pressure distillation at 45° C., drying is continued to obtain the hydrophobic heat-absorbing material.

200 g of sodium bicarbonate is refined by the spray drying method to obtain powder with a particle size of less than or equal to 18 m; then the refined powder is stirred and dispersed in 2000 mL of anhydrous n-hexane; then 2 g of emulsified silicone oil is added and mixed evenly; the stirring is continued for 1 hour at temperature of 55° C.; most n-hexane is recovered by reduced pressure distillation; and then hydrophobic treatment is conducted at normal pressure and temperature of 100° C. for 3 hours to obtain the hydrophobic fire extinguishing agent.

Then, the hydrophobic heat-absorbing material and a hydrophobic fire extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 5

Firstly, 200 g of Na2P2O7·10H2O is refined by the ball milling method to obtain powder with a particle size of less than or equal to 16 mm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 55° C. for 10 hours; and after most n-hexane is recovered by reduced pressure distillation at 45° C., drying is continued to obtain the hydrophobic heat-absorbing material.

Then, the above hydrophobic heat-absorbing material and a perfluoro-2-methyl-3-pentanone chemical gas extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 6

Firstly, 200 g of Na2P2O7·10H2O is refined by the ball milling method to obtain powder with a particle size of less than or equal to 16 mm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 60° C. for 10 hours; and after most n-hexane is recovered by reduced pressure distillation at 45° C., drying is continued to obtain the hydrophobic heat-absorbing material.

Then, the hydrophobic heat-absorbing material and a heptafluoropropane chemical gas extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

Embodiment 7

Firstly, 200 g of Na2P2O7·10H2O is refined by the ball milling method to obtain powder with a particle size of less than or equal to 16 mm; the refined powder is stirred and dispersed in 2000 mL of anhydrous n-hexane; then 2 g of emulsified silicone oil is added and mixed evenly; the stirring is continued for 5 hours at temperature of 45° C.; then the hydrophobic treatment is conducted in a reactor at temperature of 60° C. for 10 hours; and after most n-hexane is recovered by reduced pressure distillation at 45° C., drying is continued to obtain the hydrophobic heat-absorbing material.

Then, the hydrophobic heat-absorbing material and a hexafluoropropane chemical gas extinguishing agent are mixed in a mass ratio of 50:50 to obtain a composite powder extinguishing agent with a cooling function.

Performance verification: the prepared composite powder extinguishing agent is loaded into a fire extinguisher, pressurized to 2 MPa and used for extinguishing 50 Ah power lithium ion battery heated to fire. Test results indicate that the open flame is extinguished within 5 s, and the battery does not reignite.

The invention claimed is:

1. A preparation method for a composite fire extinguishing agent with a cooling function, the preparation method comprising the following steps conducted in sequence:
    S1 conducting refining and hydrophobic treating on heat-absorbing material;
    S2 mixing the treated heat-absorbing material and a fire extinguishing agent proportionally to obtain a composite fire extinguishing agent with a cooling function,
    wherein the heat-absorbing material is crystalline hydrated salt which is selected from at least one of $Ba(OH)_2 \cdot 8H_2O$, $MgCl_2 \cdot 6H_2O$, $NH_4Al(SO_4)_3 \cdot 12H_2O$ and $Na_2P_2O_7 \cdot 10H_2O$; a refining treatment method comprises: refining the heat-absorbing material by at least one of a ball milling method, a supersonic airflow crushing method and a spray drying method to obtain heat-absorbing material powder with a particle size of less than or equal to 20 μm; and a hydrophobic treatment method comprises: stirring and dispersing the refined heat-absorbing material powder in anhydrous n-hexane; then adding emulsified silicone oil with mass fraction of 1-3% and mixing evenly; continuing the stirring for 5-6 hours at 45° C.; then conducting the hydrophobic treatment in a reactor at temperature of 50-60° C. for 7-10 hours; recovering most n-hexane by reduced pressure distillation; and finally, conducting drying to obtain the hydrophobic heat-absorbing material.

2. The preparation method for the composite fire extinguishing agent with the cooling function according to claim 1, wherein in step 2), the fire extinguishing agent is at least one of a powder extinguishing agent and a chemical gas extinguishing agent.

3. The preparation method for the composite fire extinguishing agent with the cooling function according to claim 2, wherein the powder extinguishing agent is selected from at least one of monoammonium phosphate, ammonium dihydrogen phosphate, potassium dihydrogen phosphate, sodium bicarbonate and potassium bicarbonate.

4. The preparation method for the composite fire extinguishing agent with the cooling function according to claim 2, wherein the chemical gas extinguishing agent is selected from at least one of 2-bromotrifluoropropylene, heptafluoropropane, hexafluoropropane, monobromotrifluoromethane, monobromochlorodifluoromethane, cis-1,1,1,4,4,4,-hexafluoro-2-butene, trans-1,1,1,4,4,4,-hexafluoro-2-butene, 3,4,5,5,5-pentafluoro-3-(trifluoromethyl)pent-1-ene, 1,1,1,2,3,4,5,5,5-nonafluoro-4-(trifluoromethyl)pent-2-ene, 1-methoxy-nonafluorobutane, 1-methoxy-heptafluoropropane, perfluoro-2-methyl-3-pentanone, perfluoro-3-methyl-2-butanone and 1,2,2,3,3,4,4-heptafluorocyclopentane.

5. The preparation method for the composite fire extinguishing agent with the cooling function according to claim 1, wherein in step 2), the mixing ratio of the heat-absorbing material and the fire extinguishing agent is 1-50:50-99.

6. The preparation method for the composite fire extinguishing agent with the cooling function according to claim 3, wherein the powder extinguishing agent is subjected to refining and hydrophobic treatment before mixed with the treated heat-absorbing material; a treatment method comprises: refining the fire extinguishing agent by at least one of the ball milling method, the supersonic airflow crushing method and the spray drying method to obtain fire extinguishing agent powder with particle size of less than or equal to 20 m; stirring and dispersing the refined fire extinguishing agent powder in anhydrous n-hexane; then adding emulsified silicone oil with a mass fraction of 1-3% and mixing evenly; continuing the stirring at temperature of 55° C. for 1-3 hours; recovering most n-hexane by reduced pressure distillation; and then conducting hydrophobic treatment at normal pressure and temperature of 80-100° C. for 3-5 hours to obtain the hydrophobic powder extinguishing agent.

* * * * *